US009900444B1

(12) United States Patent
Seetharaman et al.

(10) Patent No.: US 9,900,444 B1
(45) Date of Patent: Feb. 20, 2018

(54) SYSTEM AND METHOD FOR ONLINE CHARGING IN A COMMUNICATION NETWORK

(71) Applicant: Wipro Limited, Bangalore (IN)

(72) Inventors: Swaminathan Seetharaman, Chennai (IN); Madhavan Kalyanaraman, Chennai (IN)

(73) Assignee: WIPRO LIMITED, Bangalore (IN)

(*) Notice: Subject to any disclaimer, the term of this patent is extended or adjusted under 35 U.S.C. 154(b) by 0 days.

(21) Appl. No.: 15/374,080

(22) Filed: Dec. 9, 2016

(30) Foreign Application Priority Data

Oct. 28, 2016 (IN) .............................. 201641037151

(51) Int. Cl.
*H04W 4/24* (2009.01)
*H04M 15/00* (2006.01)
(Continued)

(52) U.S. Cl.
CPC ........ *H04M 15/64* (2013.01); *H04L 12/1403* (2013.01); *H04M 15/43* (2013.01);
(Continued)

(58) Field of Classification Search
CPC . H04L 63/20; H04L 61/2503; H04L 61/1511; H04L 63/0272; H04L 12/1407;
(Continued)

(56) References Cited

U.S. PATENT DOCUMENTS

| 2015/0036547 | A1 | 2/2015 | Livne et al. | |
|---|---|---|---|---|
| 2015/0326738 | A1* | 11/2015 | Li | H04L 12/1403 455/406 |
| 2016/0036598 | A1* | 2/2016 | Chai | H04L 43/028 370/259 |

FOREIGN PATENT DOCUMENTS

| GB | 2509634 | 7/2014 |
|---|---|---|
| WO | WO 2011/101131 | 8/2011 |
| WO | WO 2015/169337 | 11/2015 |

OTHER PUBLICATIONS

3GPP TS 32.260 v10.5.0, "$3^{rd}$ Generation Partnership Project: Technical Specification Group Services and Systems Aspects; Telecommunication management; Charging management; IP Multimedia Subsystem (IMS) charging (Release 10)", Sep. 2011, *3GPP*, pp. 1-138.

(Continued)

*Primary Examiner* — Phuoc H Doan
(74) *Attorney, Agent, or Firm* — Finnegan, Henderson, Farabow, Garrett & Dunner, LLP

(57) ABSTRACT

This disclosure relates generally to communication network, and more particularly to a system and method for online charging in a communication network. In one embodiment, a method is provided for online charging in a communication network. The method comprises monitoring at least one of a user characteristic, a session characteristic, an event characteristic, and a network condition during one or more ongoing communication sessions involving an online charging via one or more initial charging trigger functions, determining a need for selection of one or more new charging trigger functions based on at least one of the user characteristic, the session characteristic, the event characteristic, and the network condition, and dynamically selecting the one or more new charging trigger functions in response to the need so as to perform online charging for the one or more ongoing communication sessions based on substantially accurate determination of resource consumption in real-time.

23 Claims, 5 Drawing Sheets

(51) Int. Cl.
*H04L 12/14* (2006.01)
*H04W 88/08* (2009.01)
*H04W 84/12* (2009.01)
*H04W 84/04* (2009.01)

(52) U.S. Cl.
CPC .......... *H04W 84/042* (2013.01); *H04W 84/12* (2013.01); *H04W 88/08* (2013.01)

(58) Field of Classification Search
CPC ... H04L 12/1435; H04M 15/09; H04M 15/64; H04M 2215/0192; H04M 15/58; H04M 15/05; H04W 4/24
USPC ................ 455/405, 406, 407, 408; 370/259; 379/114.15, 114.16
See application file for complete search history.

(56) References Cited

OTHER PUBLICATIONS

3GPP TS 32.240 v9.1.0, "3$^{rd}$ Generation Partnership Project; Technical Specification Group Services and Systems Aspects; Telecommunication management; Charging management; Charging architecture and principles (Release 9)", Jun. 2010, *3GPP*, pp. 1-44.
ETSI TS 129 212 v7.4.0, Universal Mobile Tetecommunications Systems (UMTS); Policy and charging control over Gx reference point (3GPP TS 29.212 version 7.40. Release 7), Apr. 2008, *ETSI*, pp. 1-45.
3GPP TS 32.252 v10.2.0, "3$^{rd}$ Generation Partnership Project: Technical Specification Group Services and Systems Aspects; Telecommunication management; Charging management; Wireless Local Area Network (WLAN) charging (Release 10)", Sep. 2011, *ETSI*, pp. 1-47.
3GPP TR 23.829 v10.0.0, "3$^{rd}$ Generation Partnership Project; Technical Specification Group Services and Systems Aspects; Local IP Access and Selected IP Traffic Offload (LIPA-SIPTO (Release 10)", Mar. 2011, *3GPP*, pp. 1-43.
3GPP TR 23.850 v11.0.0, "3$^{rd}$ Generation Partnership Project; Technical Specification Group Services and Systems Aspects; Study on roaming architecture for voice over IP Multimedia Subsystem (IMS) with local breakout (Release 11)", Dec. 2011, *3GPP*, pp. 1-40.
3GPP TR 23.849 v11.0.0, "3$^{rd}$ Generation Partnership Project; Technical Specification Group Services and Systems Aspects; Study on Stage 2 aspects of Resources (OSCAR) in the IP Multimedia Subsystem (IMS) whilst roaming (Release 11)", Mar. 2012, *3GPP*, pp. 1-28.
ETSI TS 132 296 v10.3.0, Digital cellular telecommunications system (Phase 2+), Universal Mobile Telecommunications System (UMTS); LTE; Telecommunication management: Charging management; Online Charging System (OCS); Applications and interfaces (3GPP TS 32.296 version 10.3.0 Release 10), Apr. 2011, *ETSI*, pp. 1-80.
Extended European International Search Report issued in the European Patent Office in counterpart European Application No. 17153601.4 dated Jul. 12, 2017, 7 pages.

\* cited by examiner

SYSTEM AND METHOD FOR ONLINE CHARGING IN A COMMUNICATION NETWORK

TECHNICAL FIELD

This disclosure relates generally to communication network, and more particularly to a system and method for online charging in a communication network.

BACKGROUND

Mobile devices have become ubiquitous in today's world and are increasingly used to perform various functions such as streaming multimedia content, playing high definition online games, enabling video calls, and so forth in addition to basic voice calls. Each of these functions and other functions requires network resources. It is therefore important to efficiently and effectively charge (i.e., bill) such communication sessions and provide optimized services.

Typically, there are 2 kinds of charging (billing) to users in communication networks: Offline Charging and Online Charging. In case of offline charging, the call detail records or charging data records (CDRs) are collected at appropriate network elements (NEs) in the network (e.g., at the packet data network (PDN) gateway (PGW) in case of a long term evolution (LTE) network) during a user session, and sent to the charging data function (CDF) at regular intervals and/or at the end of a user session. The CDR may include information such as users involved in the session, resources used for the session (e.g., bandwidth, bytes of information exchanged, codecs), services invoked during the session (e.g., forwarding, conference), session start and stop timestamps, etc. The CDR may also include metering units that were consumed for the session. The network element that sends the CDR to the CDF is also referred to as charging element or as charging trigger function (CTF). The CDF may further send the received CDR(s) directly or via the charging gateway function (CGF) to the billing domain (BD) which may be a part of the business support system (BSS). The BSS then uses these received CDR(s) to determine the amount to be charged to the user for the session. Thus, offline charging involves post processing after the session ends and is typically used in the post-paid charging scenario.

In case of online charging, the online charging system (OCS) triggers the appropriate NEs in the network to compare the entitlement of the user versus the charges of resources used in real-time. The OCS then determines the cumulative charges for the resource usage by the user and decides to terminate the user session in case the charges exceed the user entitlement. In such a case the OCS may trigger termination or may direct the NE to terminate the session. Thus, online charging involves taking actions based on the user entitlement in a real-time manner when the user's session(s) is in progress. Online Charging is usually preferable from a functionality and user experience aspect. However, online charging is also more demanding with respect to network resources and thus, a network may have less capacity to support online charging. In particular, in the context of heterogeneous networks, service and session continuity typically spans across multiple different networks. Under such scenario with user sessions spanning across multiple heterogeneous networks, the online charging specifically gets complicated leading to inaccurate charging (under/over-charging).

In one scenario, a particular user session may simultaneously span across multiple access networks, e.g., LTE and Wi-Fi. In other words a user session is split across multiple access networks. For accurate charging, the charging element should be able to obtain information in real-time about the resource consumption by the session that spans over each of those access networks. However, obtaining information on real-time resource consumption across multiple access networks is not possible. This is because of the lack of interface and interaction between the OCS and the NE that performs the session-split (e.g., if eNodeB performs the session split), or because the NE that performs the session-split is not capturing and reporting the access level resource consumption information in real-time (e.g., if PGW performs the session split). No standard mechanism exists for reporting the resource consumption over each of these access networks, hence compounding the issue in scenarios involving user mobility across networks. Existing techniques provide a mechanism of allocating separate quotas during session establishment, per access network to user sessions spanning different access networks. Existing techniques also provide allocation of additional quota from the network on request. However, the mechanisms provided by existing techniques have limitations of monitoring consumption of user quota on individual networks during the user session. The limitation is that the monitoring consumption of user quota on individual networks can be performed only if the PDN Gateway (PGW) is aware of the session split, and the number of packets routed via each of the access networks. For example, when the session-split happens in the Radio Access Network (RAN), the eNodeB performs the session-split between LTE and Wi-Fi. Thus, the Core NEs are unaware of the session-split, and the eNodeB does not perform charging related functions. The eNodeB or any other Core-NE therefore fails to perform proper monitoring of consumption of user quota. An obvious solution to overcome this limitation may be to introduce charging functionality and appropriate online charging interface at eNodeB. However, during handover (HO), roaming and session-offloading condition, this solution fails to work.

In another scenario, a user may have one or more active sessions with varying priorities, and a particular session gets offloaded at any point of time onto another network, thereby causing change in charging element resulting in disparate charging due to the fact that the new charging element may not have the same capability or granularity of monitoring the resources consumed for the session, etc. Existing techniques provides a mechanism of online charging when offloading to WLAN and via a local network without going via the wireless packet core network. However, these techniques do not address the granularity of monitoring the resources consumed for the session (e.g., only a flat rate charging may be provided). Hence the mechanisms proposed in these existing techniques may lead to inaccurate charging. Also, these existing techniques do not cover handover and roaming/mobility scenarios with respect to the information to be exchanged, interfaces, etc. with the OCS. Hence, the online charging mechanism fails to work in such scenarios. Thus, the existing techniques fail to address online charging effectively in scenarios involving user session handover across heterogeneous networks due to differences in capabilities and granularity of monitoring, and the lack of information exchanged in real-time between the charging entities.

In yet another scenario, the user may be roaming where the session may be routed without involving the home network. Also, lack of interaction among the charging elements of different networks in case of online charging during optimized session routing using the principles outlined in the "Study on roaming architecture for voice over IP Multimedia Subsystem (IMS) with local breakout" (3GPP TR 23.850 Release 11.0.0), "Optimal media routing (OMR) within the IP Multimedia Subsystem (IMS); Stage 3" (3GPP TR 29.079 Release 11.3.0), and/or "Study on Stage 2 aspects of Optimized Service Charging and Allocation of Resources (OS-CAR) in the IP Multimedia Subsystem (IMS) whilst roaming" (3GPP TR 23.849 Release 11.0.0) between the visited and/or home network of the calling user and the home and/or visited network of the called user, leads to failure in online charging. Existing techniques provide mechanism of CDR generation by the visited mobile network (V-PLMN) (e.g., Visited Call Session Control Function (V-CSCF)) and sending it to the CDF in case of sessions involving a roaming user. However, it fails to provide interaction between the charging entities in the different networks and OCS(s) in case of a roaming user, leading to failure of online charging.

In fact, all the above discussed scenarios may be possible for a single user simultaneously, that is likely to lead to incorrect charging or failure in online-charging and unexpected termination of user sessions. Further, existing techniques typically recommends termination of the session upon exhaustion of the user quota. As a consequence improved service offering by making the best use of available network resources without violating policies is not possible especially when the cumulative cost of resource consumption approaches the user-quotas or reaches the user-quota limits. This is because appropriate actions on user sessions taking into consideration user priorities, dynamic network conditions, historical data, etc. is not done instead of simply deciding to terminate the user session(s).

The above problems or issues are caused due to following limitation in the existing mechanisms in online charging scenario across heterogeneous networks: (a) inadequate exchange of online resource consumption information in real-time with the appropriate entities (OCS) across heterogeneous networks is a challenge due to protocol, capability mismatch, granularity and frequency of such shared information, (b) insufficient granularity and frequency of monitoring resources consumption by OCS in a user-session (from a charging perspective), and analyzing such information for determination of cumulative resource charges, and (c) user session termination based on pre-assigned quota at the beginning of the session without taking into consideration user-entitlement, user-preferences, network conditions and real-time resource consumption information of all sessions for the user. Existing techniques of online charging thus fail to address the above limitations.

SUMMARY

In one embodiment, a method for online charging in a communication network is disclosed. In one example, the method comprises monitoring at least one of a user characteristic, a session characteristic, an event characteristic, and a network condition during one or more ongoing communication sessions involving an online charging via one or more initial charging trigger functions. The method further comprises determining a need for selection of one or more new charging trigger functions based on at least one of the user characteristic, the session characteristic, the event characteristic, and the network condition. The method further comprises dynamically selecting the one or more new charging trigger functions in response to the need so as to perform online charging for the one or more ongoing communication sessions based on substantially accurate determination of resource consumption in real-time.

In one embodiment, a system for online charging in a communication network is disclosed. In one example, the system comprises at least one processor and a memory communicatively coupled to the at least one processor. The memory stores processor-executable instructions, which, on execution, cause the processor to monitor at least one of a user characteristic, a session characteristic, an event characteristic, and a network condition during one or more ongoing communication sessions involving an online charging via one or more initial charging trigger functions. The processor-executable instructions, on execution, further cause the processor to determine a need for selection of one or more new charging trigger functions based on at least one of the user characteristic, the session characteristic, the event characteristic, and the network condition. The processor-executable instructions, on execution, further cause the processor to dynamically select the one or more new charging trigger functions in response to the need so as to perform online charging for the one or more ongoing communication sessions based on substantially accurate determination of resource consumption in real-time.

In one embodiment, a non-transitory computer-readable medium storing computer-executable instructions for online charging in a communication network is disclosed. In one example, the stored instructions, when executed by a processor, cause the processor to perform operations comprising monitoring at least one of a user characteristic, a session characteristic, an event characteristic, and a network condition during one or more ongoing communication sessions involving an online charging via one or more initial charging trigger functions. The operations further comprise determining a need for selection of one or more new charging trigger functions based on at least one of the user characteristic, the session characteristic, the event characteristic, and the network condition. The operations further comprise dynamically selecting the one or more new charging trigger functions in response to the need so as to perform online charging for the one or more ongoing communication sessions based on substantially accurate determination of resource consumption in real-time.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
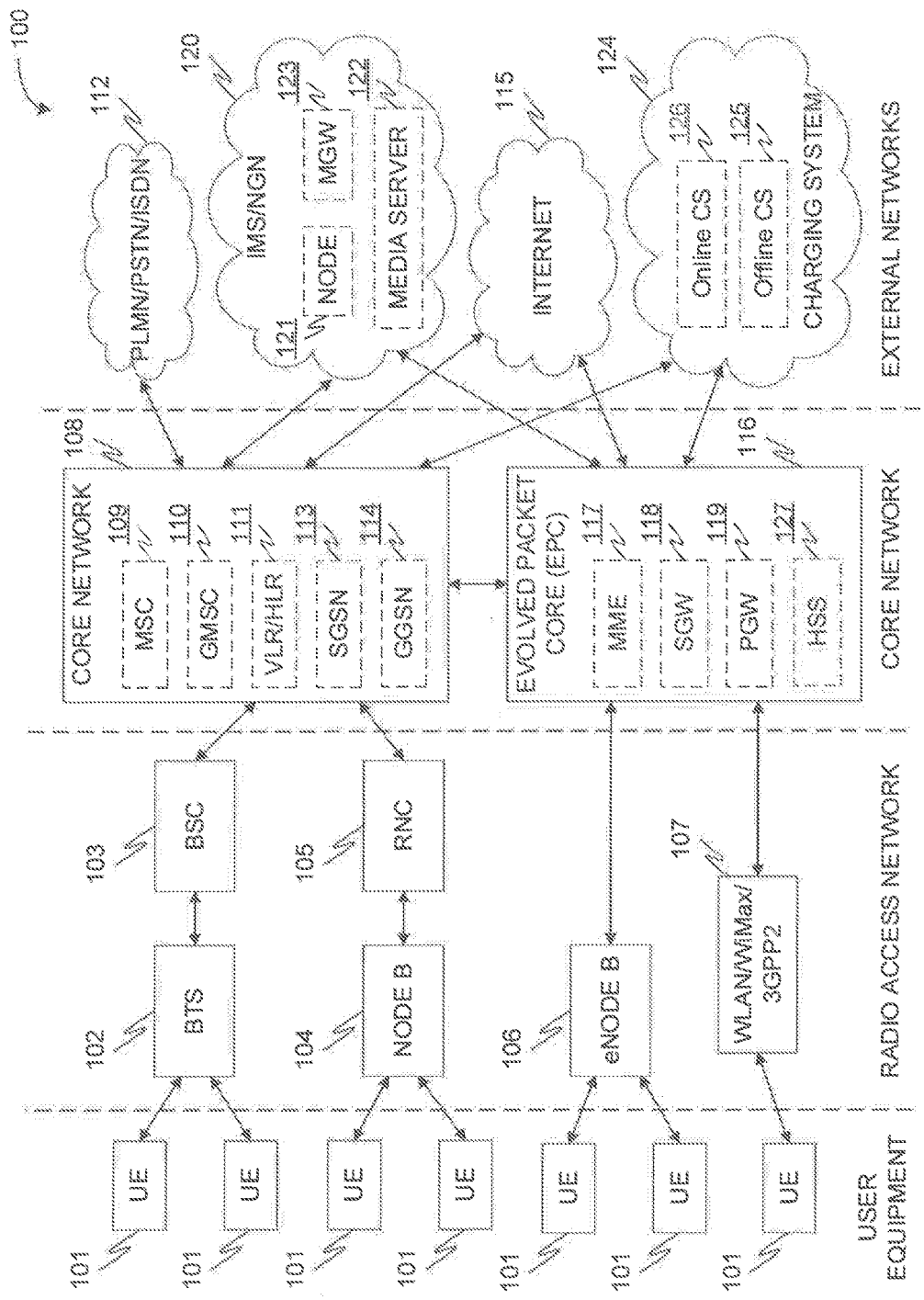
FIG. 1 illustrates an exemplary communication network architecture in which various embodiments of the present disclosure may function.

Referring now to FIG. 1, an exemplary communication network architecture in which various embodiments of the present disclosure may function is illustrated. The communication network 100 may include one or more user equipments (UE) 101 communicating wirelessly with various radio access networks. Examples of a UE 101 may include but are not limited to a cell phone, a smart phone, a tablet, a phablet, and a laptop. For purpose of illustration, the various radio access networks include but are not limited to a GSM EDGE radio access network (GERAN), a UMTS terrestrial radio access network (UTRAN), and an evolved UMTS terrestrial radio access network (E-UTRAN). A base transceiver station (BTS) 102 and a base station controller (BSC) 103 form the GERAN while a Node B 104 and a radio network controller (RNC) 105 form the UTRAN. Similarly, evolved Node B (eNode B) 106 form the E-UTRAN and acts as the base station for E-UTRAN i.e., LTE network. However, the depicted radio access networks are merely exemplary, and thus it will be understood that the teachings of the disclosure contemplate other wired and wireless radio access networks such as worldwide interoperability for microwave access (WiMAX) network 107, wireless local area network (WLAN), code division multiple access (CDMA) network, High Speed Packet Access (3GPP's HSPA) network, 3GPP2 network 107, and so forth.

Each of the radio access networks may communication with a respective core network which in turn may communicate with external networks. The core network may include a packet core which in turn may communicate with external packet switched networks. For example, in the illustrated embodiment, the GERAN and the UTRAN communicate with a core network 108 comprising mobile services switching center (MSC) 109, gateway MSC (GMSC) 110, home location register or visitor location register (HLR/VLR) 111. The MSC 109 and GMSC 110 serve the UE 101 in its current location for circuit switched services and are responsible for the interworking with external circuit switched networks 112. In some embodiments, the MSC 109 and GMSC 110 also interwork with external packet switched networks, such as IP multimedia subsystem (IMS) network 120. For example, the MSC 109 may connect to a media gateway (MGW) 123 of the IMS network 120. The HLR/VLR 111 is a mobile operator database accessible by MSC 109 and which includes information with respect to users such as phone number, location within home/visiting network, and so forth. The core network 108 also comprises a packet core that comprises serving GPRS support node (SGSN) 113 and gateway GPRS support node (GGSN) 114.

As will be appreciated by those skilled in the art, general packet radio service (GPRS) is a packet-oriented mobile data service that enables 2G and 3G cellular networks to transmit IP packets to external networks such as the Internet. The SGSN 113 is a component of the GPRS network that handles functions related to packet switched data within the network such as packet routing and transfer, mobility management, charging data, authentication of the users, and so forth. Similarly, GGSN 114 is another component of the GPRS network and is responsible for the interworking between the GPRS network and external packet switched networks, such as Internet 115 or IP multimedia subsystem (IMS) network 120.

Similarly, E-UTRAN communicates with an evolved packet core (EPC) 116 that comprises a mobility management entity (MME) 117, a serving gateway (SGW) 118, a packet data network (PDN) gateway (PGW) 119, and a Home Subscriber Server (HSS) 127. The MME 117 may be responsible for evolved packet system (EPS) session management (ESM), EPS mobility management (EMM), EPS connection management (ECM), ciphering and integrity Protection, inter core network signaling, system architecture evolution (SAE) bearer control, handover, and so forth. The combined functionalities of the SGW 118 and the PGW 119 may include lawful interception (LI), packet routing and forwarding, transport level packet marking in the uplink and the downlink, packet filtering, mobile IP, policy enforcement, and so forth. The PGW 119 further connects the EPC 116 with external packet switched networks such as the Internet 115 or next generation network (NGN) 120. The HSS 127 is a master user database containing user subscription related information such as user identification, user profile, and so forth. The HSS 127 performs authentication and authorization of the user, and so forth.

The external networks may include the circuit switched network 112 such as public land mobile network (PLMN), public switched telephone network (PSTN), integrated service digital network (ISDN), and so forth. The external networks may also include Internet 115 and any other packet switched networks 120. Examples of the packet switched networks may include but are not limited to a next generation network (NGN), an IP multimedia subsystem (IMS) network, and so forth. The packet switched networks 120 may include a node 121 that anchors the session and is responsible for session management, routing and control. The node 121 may be a media gateway controller (MGC) in case of the NGN, or a serving-call session control function (S-CSCF) in case of the IMS networks. Additionally, the node 121 may be responsible for control and management of media servers 122. In some embodiments, the node 121 may invoke the services of a media resource broker (MRB) for selecting the appropriate media server 117. The packet switched networks 120 may further include a media gateway (MGW) 123 that enables multimedia communications across packet-switched and circuit-switched networks by performing conversions between different transmissions and coding techniques. In some embodiments, the packet switched networks 120 may also include a signalling gateway (not shown) that may be used for performing interworking between signalling protocols such as signalling system 7 (SS7) when connecting to PSTN/PLMN networks and IP-based signalling protocols such as SIGTRAN which is supported by the node 121. It should be noted that, in some embodiments, the packet switched networks 120 may also access and use the HSS 127.

The external networks may further include charging (i.e. billing) system 124. As stated above, the charging system 124 may include an offline charging system 125 and an online charging system 126. In particular, the online charging system 126 comprises one or more processors and a computer-readable medium (e.g., a memory) so as to implement various modules and/or subsystems for effective online charging in a wired, a wireless, a homogenous, or a heterogeneous communication network in accordance with aspects of the present disclosure. For example, the computer-readable medium stores instructions that, when executed by the one or more processors, cause the one or more processors to perform dynamic selection of charging trigger functions (CTFs) so as to perform effective online charging for the one or more ongoing communication sessions based on substantially accurate determination of resource consumption in real-time. As will be appreciated by those skilled in the art, the CTF may be selected from among the one or more network elements (NEs) in the communication network 100 that are capable of performing the role of CTF for the session. For example, in some embodiments, the CTF may be a PGW or a SGSN. Further, in accordance with aspects of the present invention, the CTF may be a eNodeB or a Local-PGW (L-PGW) (may be employed if the session is a Local IP access (LIPA) session), a selected IP traffic offload-gateway (SIPTO-GW) (may be employed if the session involves selected IP traffic offload (SIPTO)), a trusted Wi-Fi access gateway (T-WAG) (may be employed if the session involves WI-Fi offloading via a trusted Wi-Fi access), an evolved packet data gateway (ePDG) (maybe be employed if the session involves Wi-Fi offloading via untrusted Wi-Fi access), and so forth. It will be further apparent to a person skilled in the art that for a communication network other than those illustrated, network components and parameters associated with that communication network will be used.

Figure 2:
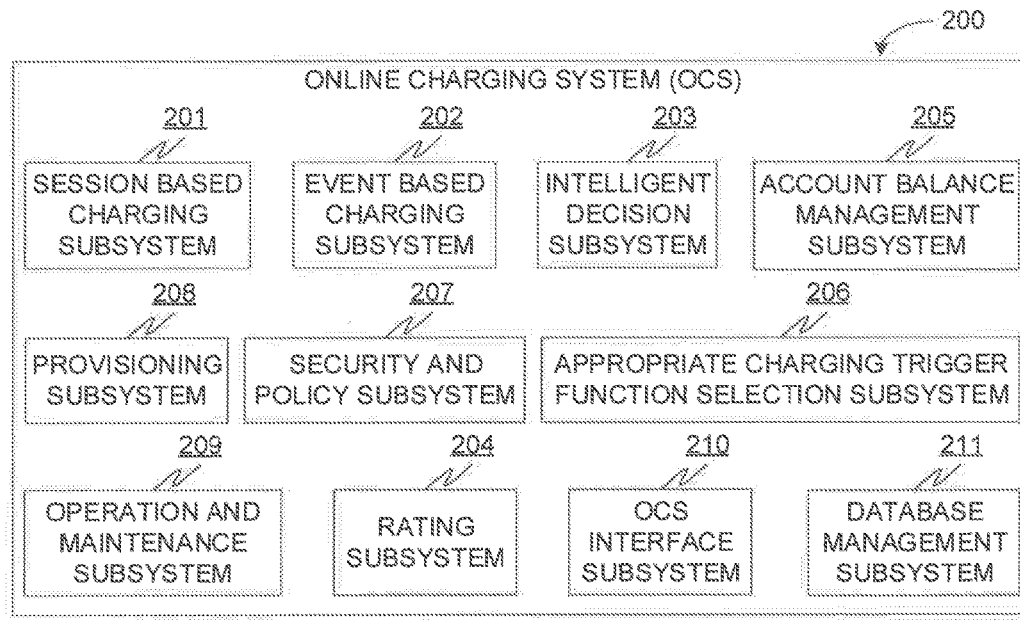
FIG. 2 is a functional block diagram of an exemplary online charging system (OCS) in the network architecture that performs online charging in accordance with some embodiments of the present disclosure.

Referring now to FIG. 2, a functional block diagram of the online charging system (OCS) 200 analogous to the online charging system 126 implemented by the communication network 100 of FIG. 1 is illustrated in accordance with some embodiments of the present disclosure. As will be described in greater detail below, the OCS 200 monitors user characteristics, session characteristics, event characteristics and/or network conditions during one or more ongoing communication sessions involving an online charging via one or more initial charging trigger functions and determines a need for dynamically selecting one or more new charging trigger functions. The OCS 200 may further select the one or more new charging trigger functions in response to the determined need so as to perform online charging for the one or more ongoing communication sessions based on substantially accurate determination of resource consumption in real-time. In some embodiments, the OCS 200 comprises a session based charging subsystem (SBCSS) 201, an event based charging subsystem (EBCSS) 202, an intelligent decision subsystem (IDSS) 203, a rating subsystem (RSS) 204, an account balance management subsystem (ABMSS) 205, an appropriate charging trigger function selection subsystem (ACTFSS) 206, a security and policy subsystem (SPSS) 207, a provisioning subsystem (PSS) 208, an operation and maintenance subsystem (OMSS) 209, an operation support system (OSS) interface subsystem (OSSISS) 210, and database management subsystems (DMSS) 211.

The SBCSS 201 is typically responsible for session-based charging and credit-control functions. Such functions include allocation of credits or quotas at a bearer level (e.g., LTE bearers) which may be based on time (duration for which the bearer is allowed to be actively carrying traffic), volume of data, etc., at a sub-system level (e.g., MGC in an NGN network), at a network level (e.g., IMS network), or at a service level. Such functions may also include, but are not limited to, communication with the RSS 204 to determine the rating to be applied for the requested resources or the resources to be provided, and communication with the ABMSS 205 to query and to update the user's entitlements. In addition to its existing functions, the SBCSS 201 determines a session type upon receiving a session initiation or modification trigger. The SBCSS 201 then triggers the ACTFSS 206 to determine the appropriate charging trigger function (CTF) 300 for the session. Additionally, the SBCSS 201 triggers the IDSS 203 to determine appropriate actions for the session. For example, when the user's remaining credits is lower than the minimum threshold, or when the user's remaining credits is <x % of entitlement ('x' may be typically provisioned by operator) and if the current session cannot continue without additional credits, then SBCSS 201 may trigger the IDSS 203 to determine appropriate actions.

The EBCSS 202 is typically responsible for event-based charging and credit-control functions. Such functions include allocation of credits or quotas at a bearer level based on request received (e.g., for a short messaging service (SMS) or a multimedia messaging service (MMS)), at a sub-system level (e.g., a media resource function (MRF) in an NGN network), at a network level (e.g., IMS network), or at a service level. Such functions may further include, but are not limited to, communication with the RSS 204 to determine the rating to be applied for the requested resources or the resources to be provided, and communication with the ABMSS 205 to query and to update the user's entitlements. In addition to its existing functions, the EBCSS 202 determines an event type upon receiving an event trigger. The EBCSS 202 then triggers the ACTFSS 206 to determine the appropriate CTF 300 for the session. Additionally, the EBCSS 202 triggers the IDSS 203 to determine appropriate actions for the session. For example, when the user's remaining credits is lower than the minimum threshold, or when the user's remaining credits is <x % of entitlement ('x' may be typically provisioned by operator) and if the current session cannot continue without additional credits, then EBCSS 202 may trigger the IDSS 203 to determine appropriate actions.

In accordance with aspects of the present disclosure, the IDSS 203 determines the appropriate actions to be taken for the session upon receiving a trigger from the SBCSS 201 or the EBCSS 202. Appropriate actions may include, but are not limited to, continuing the session for a pre-provisioned duration, continuing the session until a pre-provisioned credit overdue is consumed, continuing the session on a relatively less expensive interface (e.g., Wi-Fi), continuing the session on a relatively less expensive interface (e.g., Wi-Fi) and/or lower quality of service (QoS) for a pre-defined duration, continuing the session on a relatively less expensive interface (e.g., Wi-Fi) and/or lower QoS until a pre-provisioned credit overdue is consumed, terminating the session, terminating another ongoing session of the same user that is of lesser priority (based on input received from the CTF 300, user preference or operator provisioned values), and so forth.

In each of the above cases, the IDSS 203 triggers the CTF 300 to send a notification to the end-user. The determination of the appropriate action will be described in greater detail below with respect to FIG. 5. To perform the above actions, the IDSS 203 interacts with the RSS 204 to know the tariffs/rates for different types of services and sessions, and with the PSS 208 to know operator policies about continuing the session on an alternate path or to stop online charging and continue offline charging. The IDSS 203 also receives appropriate provisioned inputs, and adapts the provisioned values based on historical data. Further, upon session termination, the IDSS 203 collects, computes, and stores relevant information about the session. For example, the relevant information about the session may include duration for which the session continued beyond the time when credit limit fell below the minimum provisioned threshold—this may be obtained from SBCSS 201. Similarly, the relevant information about the session may include credit not actually charged to the user—this may be calculated with the help of the inputs from RSS 204 on the tariff, and the input received from the SBCSS 201 on the duration for which the session continued beyond the minimum credit limit threshold. Other relevant information may also include information about load levels of the CTF 300 and the number of sessions which may not be initiated due to non-availability of resources during the time the user session continued beyond the minimum credit limit threshold—this information may be received from the CTF 300, via the SBCSS 201.

The RSS 204 is typically responsible for performing monetary and non-monetary rating, i.e., unit determination. For example, the RSS 204 maintains tariff information, discounts, etc. which could be different based on one or more of the following parameters: type of service (e.g., voice call, video call), and sub-service type (e.g., local call, international call, etc.), time of day, day of the week or special days (e.g., New Year, Christmas), user location (e.g., user is in home network or roaming), data volume (e.g., fixed tariff for first 1 megabyte, then incremental for every kilobyte, or, different tariff for first 2 megabytes, then a higher tariff for next 4 megabytes, etc.), access network used (e.g., LTE, Wi-Fi), and so forth. Additionally, the RSS 204 determines the tariff that is applicable for a received rate request based on the information received in the rate request and mapping to the provisioned tariff information, current usage levels (against the entitlement), and using one or more of information such as time of day, date, day of the week, user's subscription plan (e.g., voice calls free for 100 minutes, 250 voice calls free per month), etc. It should be noted that the RSS 204 may interact with ABMSS 205 to obtain relevant information such as usage counter values so as to determine the current usage levels of the user. The RSS 204 may perform rating in terms of time, resource volume (e.g., bytes transferred), request volume (e.g., number of voice sessions), events, etc. In some embodiments, the RSS 204 may maintain the counters used for maintaining the account balance and entitlement of the subscriber instead of the ABMSS 205. Further, the RSS 204 is responsible for interfacing with the SBCSS 201 and/or EBCSS 202. In addition to its existing functions, the RSS 204 provides the information requested by the IDSS 203.

The ABMSS 205 is typically responsible for maintaining usage counters for subscribers and hence the credit/entitlement balance. For example, the ABMSS 205 may increase or decrease specific counters with a specific value, which may happen once during a session or per unit of service consumed (data volume, time duration, etc.). Additionally, the ABMSS 205 may set one or more specific counters to a pre-determined value—this may be resetting a counter or creating a new counter corresponding to a re-charge in account balance by the subscriber. Further, the ABMSS 205 may set an expiry date and time for one or more specific counters (e.g., counter corresponding to the number of free voice calls per month should be reset each month). In addition to its existing functions, the ABMSS 205 receives inputs about the provisioned value of the overdue credit limits, and passes this information upon request to the IDSS 203.

The ACTFSS 206 performs functions related to determination and selection of the appropriate CTF 300 for the session in accordance with aspects of the present disclosure. The appropriate CTF 300 may be dynamically selected from among the network elements (NEs) capable of performing the role of CTF for the session. As will be described in greater detail below with respect to FIG. 5, the determination of the appropriate CTF 300 is based on nature of session, session type determined by the SBCSS 201, nature of event, event type determined by the EBCSS 202, provisioned inputs by the operator, user mobility, continuity of online charging, and so forth.

The SPSS 207 is typically responsible for providing policy inputs related to online charging such as credit units to be provided initially for a session, maximum units to be provided for a request, and so forth. In addition to its existing functions, the SPSS 207 provides relevant inputs about the policy for online charging for the specific session type, and also considering roaming. Additionally, the SPSS 207 provides relevant inputs about the security requirements for authenticating/authorizing the CTF. As will be appreciated, this is typically essential for online charging in roaming scenarios.

The PSS 208 is typically responsible for obtaining inputs provisioned by the operator such as tariff information, counter thresholds, special offers, discounts for specific customers, and so forth. Further, the PSS 208 passes such information to relevant sub-systems in the OCS 200 such as RSS 204, ABMSS 205, etc. In addition to its existing functions, the PSS 208 receives the new provisioned inputs such as duration for which a session (or certain session types) can continue even if the remaining credit balance is below the provisioned threshold, policy inputs for selecting the appropriate CTF 300, various threshold values, and so forth. The PSS 208 then passes the received provisioned inputs to the relevant subsystems in the OCS 200.

The OMSS 209 handles all operation and maintenance tasks such as logging, raising alarms to the operator, performing system maintenance actions, and so forth. The OSSISS 210 is typically responsible for interfacing with operations support systems. In addition to its existing functions, the OCSISS 210 passes any information and triggers received from the other sub-systems in the OCS to the CTF and vice versa. The DMSS 211 handles all database management functions such as storing provisioned inputs (e.g., user entitlements, expiry, etc.), resource usage information (e.g., counter values), tariff details, etc. in one or more databases, ensuring availability of the databases, and so forth.

Figure 3:
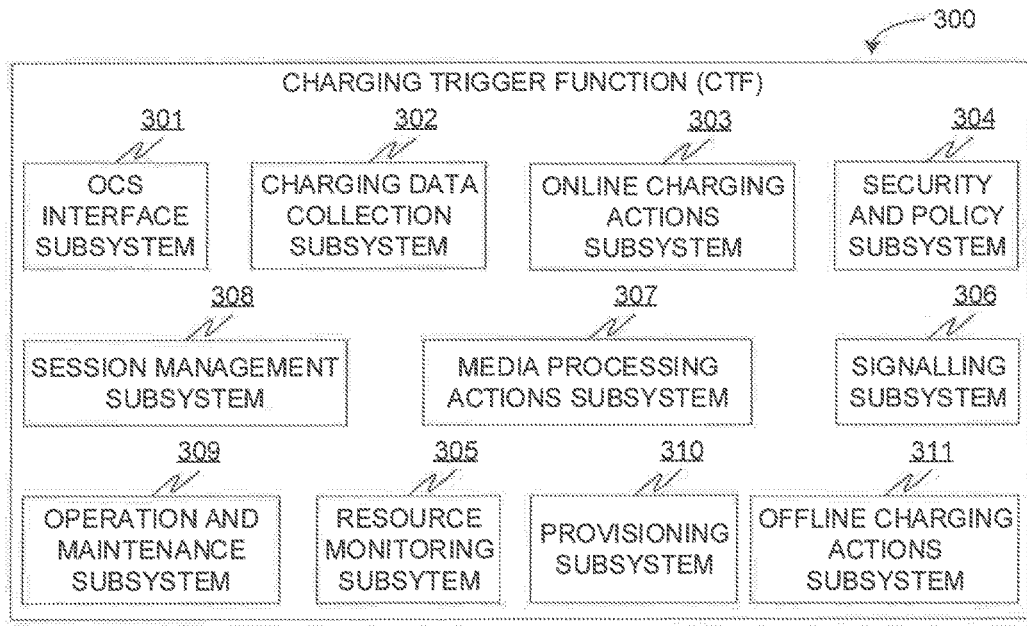
FIG. 3 is a functional block diagram of an exemplary charging trigger function (CTF) in accordance with some embodiments of the present disclosure.

Referring now to FIG. 3, a functional block diagram of the charging trigger function (CTF) 300 is illustrated in accordance with some embodiments of the present disclosure. In general, the online-charging related functions of a CTF 300 include monitoring resource usage based on specific triggers, generating charging events based on the usage of network resources and forwarding them to the OCS 200, delaying start/continuation of resource usage for the user session until allowed by the OCS 200 to do so, tracking the availability of resource usage permission (quota supervision), enforcing termination of network resource usage when permission to start/continue using the resources is not granted by the OCS 200 or when the permission granted by the OCS 200 expires. As stated above, the CTF 300 may be dynamically selected from among the one or more network elements (NEs) in the communication network 100 of FIG. 1 that are capable of performing the role of CTF for the session. For example, the CTF 300 may be any network element (e.g., MSC 109, SGSN 113, PGW 119, etc.) that already performs online charging related functions, or it can be a network element (e.g., eNodeB 106) that may be enhanced to perform online charging related CTF actions. In some embodiments, the CTF 300 comprises a OCS interface subsystem (OCSISS) 301, a charging data collection subsystem (CDCSS) 302, an online charging actions subsystem (OCASS) 303, a security and policy subsystem (SEPOSS) 304, a resource monitoring subsystem 305, a signaling subsystem (SSS) 306, a media processing actions subsystem (MPASS) 307, a session management subsystem (SMSS) 308, an operation and maintenance subsystem (OMSS) 309, a provisioning subsystem (PSS) 310, and an offline charging actions subsystem (OfCASS) 311.

The OCSISS 301 is typically responsible for interfacing with the OCS 200. In addition to its existing functions, the OCSISS 301 transparently passes all additional information and triggers received from the other sub-systems in the CTF 300 to the OCS 200 and vice versa.

The CDCSS 302 is typically responsible for collecting the required charging data for the user sessions based on appropriate triggers. The CDCSS 302 may collect such information by virtue of being in the path of information flows which enables direct measurement (e.g., collecting data on user data bytes transferred for a user session by a PGW 119, collecting data on time of session setup and release by a node 121 which may be a CSCF in an IMS network). Alternatively, the CDCSS 302 may collect such information from a network element that it controls (e.g., the CDCSS 302 in a media gateway controller acting as CTF for the session may collect information on user data bytes transferred by a media gateway controlled by the media gateway controller). In addition to its existing functions, the CDCSS 302 collects the required charging data at the granularity specified by the OCS 200 (e.g., once every second, every 5 kb of data transferred, etc.) and passes it to the OCASS 303. If the CTF 300 is not capable of collecting this data on its own, it then determines the appropriate network element(s) whose inputs are required. In some embodiments, such determination is made by the CDCSS 302 based on the inputs received from the OCS 200 about the granularity and frequency of data collection and reporting, the session type, and so forth.

The OCASS 303 is typically responsible for functions such as delaying start or continuation of resource usage for the user session until allowed by the OCS 200 to do so, tracking the availability of resource usage permission (quota supervision), enforcing termination of network resource usage when permission to start or continue using the resources is not granted by the OCS 200 or when the permission granted by the OCS 200 expires. In addition to its existing functions, the OCASS 303 sends a status report at the frequency indicated by the OCS 200. Additionally, the OCASS 303 sends CTF session termination parameters to the OCS 200 during session termination. The CTF session termination parameters include information such as number of sessions rejected due to insufficient resources after the current session continued without sufficient credits, whether the session ended normally or was it triggered to be terminated forcefully by the CTF 300, load conditions in the CTF 300, congestion levels in the network segment of the CTF 300, amount of data (bytes and/or packets) transferred after the session continued without sufficient credits, duration for which the session continued without sufficient credits, peak bandwidth consumed when the session continued without sufficient credits, and so forth. The OCASS 303 further sends relevant information such as network conditions, resource usage levels in the CTF 300, etc., when sending a notification to the OCS 200 upon credit units falling below minimum threshold provided by the OCS 200. Moreover, upon receiving a feedback from the OCS 200 on the actions to be taken for the session, the OCASS 303 pass relevant instructions and triggers to the various sub-systems in the CTF 300 to carry out actions such as lowering the Quality of Service (QoS) of the session, offloading the session on to a less expensive interface, etc.

The SEPOSS 304 is typically responsible for handling policy related aspects of the CTF function. In addition to its existing functions, the SEPOSS 304 is responsible for providing inputs regarding the security and policy aspects to the CDCSS 302. The RMSS 305 is typically responsible for monitoring the current load and resource occupancy levels on the CTF 300, the current network conditions in the network segment in which the CTF 300 is present (e.g., congestion level), and triggering necessary preventive or corrective actions including sending an alarm to the operations support system. In addition to its existing functions, the RMSS 305 informs the OCS 200, via the OCSISS 301, the current load and resource occupancy levels on the CTF 300, the current network conditions in the network segment in which the CTF 300 is present (e.g., congestion level) periodically as well as when pre-provisioned thresholds for such parameters (that are being monitored by the RMSS 305) are crossed. Additionally, the RMSS 305 sends the report on network conditions and resource occupancy levels also to the OCASS 303.

The SSS 306 is typically responsible for functions such as, but not limited to, taking care of sending, receiving and processing signaling messages from other network elements in the communication network 100. The MPASS 307 is typically responsible for functions such as, but not limited to, transferring, processing, or duplicating media packets. The SMSS 308 is typically responsible for functions such as, but not limited to, taking actions related to session setup, maintenance and tear-down. The OMSS 309 is typically responsible for functions such as, but not limited to, handling all operation and system maintenance actions such as backup, software loading, logging, and so forth. The PSS 310 is typically responsible for functions such as, but not limited to, obtaining inputs provisioned by the network operator. The OfCASS 311 is typically responsible for functions such as, but not limited to, handling all offline charging related actions such as collecting information required for CDR generation, generation of CDR, sending CDR to the CDF, and so forth. It should be noted that the presence and actual functions of the subsystems 306-311 may depend on the network element (NE) which performs the role of CTF 300. For example, if a CSCF performs the role of CTF 300, it may not have the MPASS 307.

It should be noted that, apart from the CTF 300 and the OCS 200, some of the network elements responsible for the media transfer/processing (e.g., eNodeB) may have to be modified to collect and report data requested by the CTF 300 at the required granularity bytes transferred per interface/path, duration and frequency of use of an interface/path (e.g., once every 500 Kb of data transfer, or once every 5 seconds), and so forth.

Further, it should be noted that the OCS 200 or the CTF 300 may be implemented in programmable hardware devices such as programmable gate arrays, programmable array logic, programmable logic devices, and so forth.

Alternatively, the OCS 200 or the CTF 300 may be implemented in software for execution by various types of processors. An identified engine of executable code may, for instance, comprise one or more physical or logical blocks of computer instructions which may, for instance, be organized as an object, procedure, function, module, or other construct. Nevertheless, the executables of an identified engine need not be physically located together, but may comprise disparate instructions stored in different locations which, when joined logically together, comprise the engine and achieve the stated purpose of the engine. Indeed, an engine of executable code may be a single instruction, or many instructions, and may even be distributed over several different code segments, among different applications, and across several memory devices.

As will be appreciated by one skilled in the art, a variety of processes may be employed for online charging for multi-session communication scenario carried over multiple different types of communication network. For example, the exemplary communication network 100 and the associated OCS 200 may facilitate dynamic selection of CTF 300 during one or more ongoing communication sessions by the processes discussed herein. In particular, as will be appreciated by those of ordinary skill in the art, control logic and/or automated routines for performing the techniques and steps described herein may be implemented by components of the communication network 100 (e.g., the charging system 124 via the associated OCS 200 and the CTF 300), either by hardware, software, or combinations of hardware and software. For example, suitable code may be accessed and executed by the one or more processors on the OCS 200 and the CTF 300 to perform some or all of the techniques described herein. Similarly, application specific integrated circuits (ASICs) configured to perform some or all of the processes described herein may be included in the one or more processors on the OCS 200 and the CTF 300. Additionally, it should be noted that though the process described below focuses on session-based charging, the process may also be equally applicable to event-based charging and will follow substantially similar principles with appropriate modifications and with the EBCSS 202 performing the actions instead of the SBCSS 201.

Figure 4:
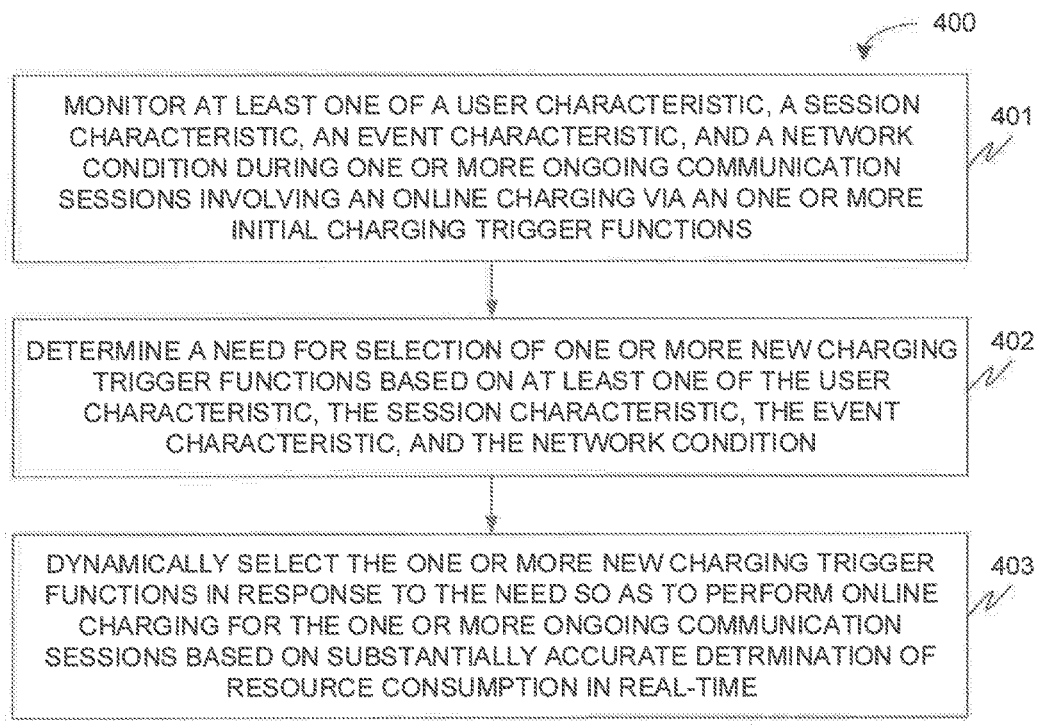
FIG. 4 is a flow diagram of an exemplary process for online charging in a communication network in accordance with some embodiments of the present disclosure.

For example, referring now to FIG. 4, exemplary control logic 400 for performing effective online charging in a communication network 100 and for providing optimized service to the users within the communication network 100 via a system, such as the OCS 200 and the CTF 300, is depicted via a flowchart in accordance with some embodiments of the present disclosure. As illustrated in the flowchart, the control logic 400 includes the steps of monitoring at least one of a user characteristic, a session characteristic, an event characteristic, and a network condition during one or more ongoing communication sessions involving an online charging via an one or more initial charging trigger functions at step 401, determining a need for selection of one or more new charging trigger functions based on at least one of the user characteristic, the session characteristic, the event characteristic, and the network condition at step 402, and dynamically selecting the one or more new charging trigger functions in response to the need so as to perform online charging for the one or more ongoing communication sessions based on substantially accurate determination of resource consumption in real-time at step 403.

It should be noted that, the user characteristic may include, but is not limited to, an identification of a user participating in the ongoing communication session, a policy with respect to the user, a location of the user, a mobility of the user, and a past behavior of the user. Additionally, it should be noted that the session characteristic may include, but is not limited to, a type of the session, a codec employed in the session, a policy with respect to the session, a duration elapsed since a previous selection of a charging trigger function for the session, a service invoked during the session, and a bandwidth consumed during the session. Further, it should be noted that the network condition may include, but is not limited to, a load on each of the one or more charging trigger functions, a policy with respect to selection of the charging trigger function, and a congestion in the network segment in which each of the plurality of charging trigger functions is located. Further, it should be noted that the event characteristic may include, but is not limited to, a type of the event such as a session initiation protocol REFER message for transferring an existing session, a handover of the user, a policy update by the network operator, an offloading of the session (e.g., over a different access network, or bypassing a part of the core network), a registration of the user with an additional device, and so forth. Moreover, it should be noted that, the CTF 300 may include, but is not limited to, a CSCF, a PGW, a SGW, a MSC, a SGSN, a GGSN, a Local-PGW (L-PGW), a selected Internet protocol traffic offload gateway (SIPTO GW), a Wi-Fi AP, a eNodeB, a V-CSCF, or any other network element capable of performing the role of CTF 300 for the session.

In some embodiments, the one or more charging trigger functions continuously monitors and accounts for the real time resource consumption for the communication session at a specified granularity and at a specified frequency. Additionally, in some embodiments, determining at step 402 or dynamically selecting at step 403 further comprises considering a plurality of pre-provisioned policies, criteria, and threshold values related to at least one of the ongoing communication sessions, the online charging, user entitlements, user preferences, the network condition, and the selection of the new charging trigger function. Further, in some embodiments, determining at step 402 or dynamically selecting at step 403 further comprises comparing the at least one of the user characteristic, the session characteristic, and the network condition against corresponding pre-pre-provisioned policies, criteria, and thresholds.

In some embodiments, the control logic 400 may further include the step of providing charging related information to the dynamically selected one or more new charging trigger functions. Additionally, in some embodiments, the control logic 400 may include the step of determining remaining user entitlement at a periodic interval based on an aggregate resource consumption for all of the one or more communication sessions by the user. In some embodiments, the control logic 400 may further include the step of dynamically determining one or more appropriate actions based on at least one of the remaining user entitlements, user preferences, and the network condition. It should be noted that the appropriate action may include, but is not limited to, offloading communication session, splitting communication session, continuing session at a lower quality of service, terminating communication session, and so forth. In some embodiments, the control logic 400 may further include the step of performing charging trigger function handover from the existing charging trigger function to the new charging trigger function. Moreover, in some embodiments, the control logic 400 may include the step of selecting the one or more initial charging trigger functions at the start of the one or more ongoing communication sessions based on at least one of the user characteristic, the session characteristic, the event characteristic, and the network condition.

Figure 5:
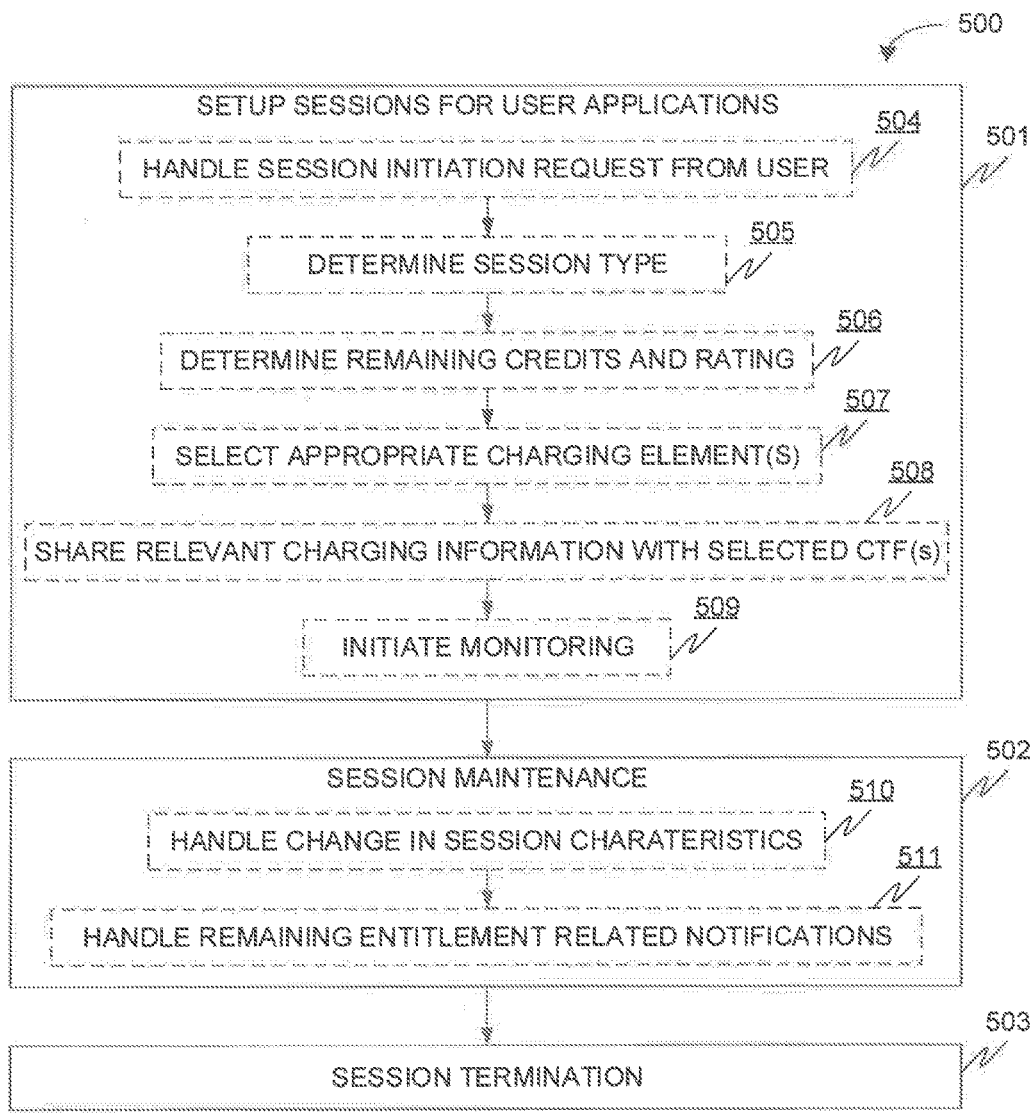
FIG. 5 is a flow diagram of a detailed exemplary process for online charging in a communication network in accordance with some embodiments of the present disclosure.

Referring now to FIG. 5, exemplary control logic 500 for performing effective online charging in a communication network 100 and for providing optimized service to the users within the communication network 100 is depicted in greater detail via a flowchart in accordance with some embodiments of the present disclosure. As illustrated in the flowchart, the control logic 500 includes the steps of setting-up session(s) for user application(s) at step 501, maintaining session(s) at step 502, and terminating session(s) at step 503. Each of these steps will be described in greater detail herein below. It should be noted that the exemplary control logic 500 is described mainly with respect to session-based charging. However, as will be appreciated by those skilled in the art, the exemplary control logic 500 may be equally applicable to event-based charging and will follow substantially similar logic with appropriate modifications. For example, for the event-based charging the EBCSS 202 will perform the actions performed by the SBCSS 201 for the session-based charging as indicated below.

In some embodiments, setting-up session(s) at step 501 further comprises handling session initiation request from the user at step 504, determining session type at step 505, determining remaining credits and rating at step 506, selecting appropriate charging element(s) or CTF(s) at step 507, sharing relevant charging information with the selected CTF(s) at step 508, and initiating monitoring at step 509.

At step 504, a user equipment 101 sends a request to the communication network for initiating a session involving online charging. Depending on the access network type and session type, the OCSISS 301 in the relevant CTF 300 sends an appropriate trigger to the OCS 200 to request for authorization and relevant charging information. Examples of various CTF are provided in a table below. It should be noted that there may be more than one CTF sending a request for the same session—e.g., a LTE voice call involving IMS.

| Access type | Nature of session | CTF |
|---|---|---|
| Don't care | IMS (controlled) session | S-CSCF |
| LTE | Don't care | PGW |
| 3G | Voice | MSC |
| 3G | Data | SGSN/GGSN |
| Don't care | LIPA | L-PGW |
| Don't care | SIPTO | SIPTO GW |
| Wi-Fi | Don't care | Wi-Fi AP |

Assuming a session based charging is applicable for the current session initiation request from the served user, at step 505, the SBCSS 201 in the OCS 200 determines the type of session based on the inputs received so far from one or more CTFs using an appropriate algorithm in accordance with aspects of the present disclosure. The exemplary algorithm is as follows:

```
If OCSISS in the S-CSCF-sent the trigger
Then
  If the user who is charged for the session (typically the
  calling user) is roaming and local breakout is applicable (i.e.,
  no routing via the home network)
  Then
    Session type = routing optimized IMS session voice/video/data
    session based on session description protocol (SDP) attributes
  Else
    Session type = voice/video/data session based on SDP attributes
  Fi
```

-continued

```
Fi
If OCSISS in the PGW sent the trigger
Then
  If eNodeB OR Wi-Fi access did NOT sent any trigger
  Then
    Session type = normal LTE access session
  Elsif eNodeB alone sent a trigger for Wi-Fi split
  Then
    Session type = split LTE-Wi-Fi session, splitting at eNodeB
  Elsif eNodeB and Wi-Fi access (trusted wireless access gateway
  (T-WAG) or evolved packet data gateway (ePDG)) sent a trigger
  Then
    Session type = spot LTE-Wi-Fi session, splitting at or beyond
    PGW
  Else
    Session type = Wi-Fi access session
  Fi
Fi
```

In other words, the SBCSS 201 determines if the OCSISS in the S-CSCF sent the trigger. If true, the SBCSS 201 then determines if the user who is charged for the session (typically the calling user) is roaming and local breakout is applicable (i.e., no routing via the home network). If true, the SBCSS 201 determines the session type to be routing optimized IMS session voice/video/data session based on session description protocol (SDP) attributes. However, if not true, the SBCSS 201 determines the session type to be voice/video/data session based on SDP attributes. Further, the SBCSS 201 determines if the OCSISS in the PGW sent the trigger. If true, the SBCSS 201 then determines if eNodeB OR Wi-Fi access did NOT sent any trigger. If true, the SBCSS 201 determines the session type to be normal LTE access session. However, if not true, the SBCSS 201 determines if eNodeB alone sent a trigger for Wi-Fi split. If true, the SBCSS 201 determines the session type to be split LTE-Wi-Fi session wherein session splitting is at eNodeB. However, if not true, the SBCSS 201 determines if eNodeB and Wi-Fi access (trusted wireless access gateway (T-WAG) or evolved packet data gateway (ePDG)) sent a trigger. If true, the SBCSS 201 determines the session type to be a split LTE-Wi-Fi session wherein session splitting is at or beyond PGW. In other scenarios, the SBCSS 201 determines the session type to be Wi-Fi access session.

At step 506, the SBCSS 201 triggers the ABMSS 205 to determine the available remaining credits for the user. The ABMSS 205 provides this information (e.g., in the form of counters) along with the indication whether the user has sufficient minimum remaining credits as provisioned by the operator (which may even be '0'). If the ABMSS 205 informs the SBCSS 201 that the user has sufficient minimum remaining credits, then the SBCSS 201 triggers the RSS 204 to determine the rating for the session.

At step 507, the SBCSS triggers the ACTFSS 206 to determine the appropriate CTF(s) for the session by passing relevant information such as the session type, current network conditions (load conditions and congestion levels in the network segment of the various available CTFs based on inputs received from the RMSS 305 of the CTFs), user location and mobility related inputs, and so forth. As will be appreciated, the CTF policy and capability related inputs may be provisioned by the operator. The ACTFSS 206 determines the appropriate CTF(s) by invoking an algorithm in accordance with aspects of the present disclosure. The exemplary algorithm is as follows:

```
If Session Type = Split LTE-Wi-Fi session, splitting at eNodeB
Then
  If user mobility is > provisioned_mobility_threshold
```

-continued

```
OR
eNodeB does not have direct interface to OCS (due to operator
  policy, etc)
OR
eNodeB has capability constraints (provisioned by operator)
OR
eNodeB has resource constraints (load/congestion related inputs
  received from PGW)
OR
Online charging should be continued mandatorily even after
  user HO
Then
   If PGW can provide online charging information at required
     granularity and frequency
   Then
      CTF = PGW
   Else
      Error case -> reject session request if online charging is
        mandatory, else instruct session to continue with offline
        charging only
   Fi
Else
   CTF = eNodeB
Fi
Fi
If Session Type = Wi-Fi access session involving ePDG/T-WAG
Then
   CTF = ePDG/T-WAG
Fi
If session type = routing optimized IMS session
Then
   CTF = V-CSCF
Fi
if session type = LIPA/SIPTO
Then
   CTF = L-PGW/SIPTO GW
Fi
If Session Type = normal LTE access session
Then
   CTF = PGW
Fi
```

In other words, the ACTFSS 206 determines if the session type is Split LTE-Wi-Fi session wherein session splitting is at eNodeB. If true, the ACTFSS 206 then determines if user mobility is greater than the provisioned mobility threshold or eNodeB does not have direct interface to OCS 200 (due to operator policy, etc.) or eNodeB has capability constraints (provisioned by operator) or eNodeB has resource constraints (load/congestion related inputs received from PGW) or online charging should be continued mandatorily even after user handover (HO). If true, the ACTFSS 206 then determines if PGW can provide online charging information at required granularity and frequency. If true, the ACTFSS 206 determines the CTF to be PGW else the ACTFSS 206 reject session request if online charging is mandatory or instruct session to continue with offline charging only. In other scenarios, the ACTFSS 206 determines the CTF to be eNodeB. Further, the ACTFSS 206 determines if the session type is Wi-Fi access session involving ePDG/T-WAG and if true, the ACTFSS 206 determines the CTF to be ePDG/T-WAG. Further, the ACTFSS 206 determines if the session type is routing optimized IMS session and if true the ACTFSS 206 determines the CTF to be V-CSCF. Further, the ACTFSS 206 determines if the session type is LIPA/SIPTO and if true the ACTFSS 206 determines the CTF to be L-PGW/SIPTO GW. Moreover, the ACTFSS 206 determines if the session type is normal LTE access session and if true the ACTFSS 206 determines the CTF to be PGW.

Upon determination of the appropriate CTF(s) 300, the IDSS 203 also informs the SBCSS 201 of relevant instructions that have to be passed to the CTF(s). For example, if session type is split LTE-Wi-Fi session wherein splitting is at eNodeB and the CTF 300 chosen was PGW, then such instructions may include instructing the PGW to request the eNodeB to collect and pass additional information for each access (e.g., LTE and Wi-Fi, LTE and pico cell). The additional information may include, but is not limited to, duration of session, bandwidth consumed, amount of data transferred (bytes/packets), etc. in the frequency as indicated by the OCS 200 (e.g., once every 5 seconds). The CDCSS 302 in the CTF 300 then passes the appropriate instructions to the relevant network elements for collecting and reporting the data required for online charging at the required granularity (bytes transferred per interface/path, duration of use of an interface/path, etc.) and frequency (e.g., once every 500 Kb of data transfer, or once every 5 seconds).

It should be noted that, in the algorithm above, the ACTFSS 206 may simply select the appropriate CTF 300 without considering the capability and resource availability aspects, but pass an indication on the data to be captured. It may then be up to the CDCSS 302 in the CTF 300 (e.g., PGW) to determine if it has the capability or if it needs inputs from additional network elements (e.g., eNodeB, T-WAG) for effectively collecting the requested online charging data at the requested frequency and granularity.

Further, for an ongoing session, if the newly determined CTF(s) 300 are different from the already active ones for the session, then appropriate handover of online charging functionality (i.e., seamless handover of CTF 300) and continuity of online charging is ensured. In some embodiments, the online charging continuity and seamless handover of CTF is performed as follows:

(a) When the ACTFSS 206 provides the newly selected CTF(s) 300 for the session, the SBCSS 201 checks if there is any change(s) in the CTF(s) 300. If there is a change, the SBCSS 201 immediately instructs the CTF(s) 300 that have to be handed over to pass the latest online charging related information, and also sends an indication of the CTF 300 handover.

(b) In parallel to Step (a), the SBCSS 201 instructs the new CTF(s) 300 to start online charging. To ensure online charging as well as session continuity without undue delays due to the online charging functionality handover, the SBCSS 201 may decide to provide a certain minimum credit units to the newly selected CTF(s) 300.

(c) Upon receiving a response from the CTF(s) 300 that are being handed over, the SBCSS 201, together with the ABMSS 205 and the RSS 204 determines the overall available remaining credits. The SBCSS 201 then sends an update to the newly selected CTF(s) 300 on the credit units. The SBCSS 201 also instructs the CTF(s) 300 being handed over to stop the online charging related actions for the session.

At step 508, the SBCSS 201 shares relevant charging information to the selected CTF(s) 300. Such relevant information includes credit units (which may be monetary or non-monetary in the form of counters), trigger for notification to the OCS 200, minimum threshold of credit units for reporting to the OCS 200, failure handling actions, granularity of monitoring, frequency of sending status reports (e.g., once every 30 seconds, once every 1 Mb of data is transferred), request to send network conditions, and so forth. There may be 3 scenarios:

(a) If an online charging trigger was not received from a CTF 300 that was selected for the session at step 507, then the SBCSS 201 sends a notification with the relevant information to perform online charging functions for the session.
  (b) If an online charging trigger (e.g., via a credit control request message) was received from a CTF 300 that was selected for the session at step 507, then the SBCSS 201 sends a response to the received trigger (e.g., a credit control answer message) with the relevant information to perform online charging functions for the session.
  (c) If an online charging trigger (e.g., via a credit control request message) was received from a CTF 300 that was not selected for the session at step 507, then the SBCSS 201 sends a response to the received trigger (e.g., a credit control answer message) with the relevant information to stop online charging functions for the session (e.g., by including a new attribute value pair (AVP) in the response indicating the reason for stopping online charging functions—i.e., selection of another CTF 300 for the session).

It should be noted that more than one scenario may be possible at the same time. For example, both scenario (a) and scenario (b) may occur together. Further, it should be noted that if multiple sessions of the same user are ongoing via the same selected CTF 300, the SBCSS 201 may also instruct that CTF 300 to 'borrow' additional credits (if required) from a session of that user whose priority is lower—this is done by passing relevant information about the priority, the session references from which such a 'borrowing' can be done, and an instruction to send a notification when such a 'borrowing' is done. This may be particularly useful for sessions with very low latency requirements, or those involving very long network path lengths with the OCS 200, e.g., in roaming scenarios.

At step 509, the OCASS 303 in each of the CTF(s) 300 selected for the session continuously monitors the resources used for the session (e.g., bandwidth consumed, elapsed duration, in-session events such as service invocation, etc.) at the granularity specified by the SBCSS 201 or the EBCSS 202 in the OCS 200 earlier, decrements the credit units (which may be monetary or non-monetary in the form of counters) accordingly, and checks if the remaining credit units is above the minimum threshold specified by the OCS 200. For example, a counter may be decremented every second, or for every packet sent, or for every 5 kilobytes of data sent/received, or for every occurrence of a specific event such as when a session initiation protocol NOTIFY/ PUBLISH message is sent, etc. The OCASS 303 in each CTF 300 sends a status report at the frequency specified by the OCS 200 (e.g., once every 30 seconds, once every 1 Mb of data is transferred).

Additionally, in some embodiments, maintaining session at step 502 further comprises handling change in session characteristics at step 510 and handling remaining entitlement (RE) related notifications at step 511. At step 510, when there is a change in the user/network/session/event characteristics due to which an action is taken to adapt the network path (e.g., congestion in LTE access network, poor radio conditions in LTE, user mobility, handover from one eNodeB to another, offloading of the session over Wi-Fi, activation of SIPTO, splitting a session over Wi-Fi and LTE, etc.), the node performing the change (CTF or otherwise) notifies the OCS 200 (e.g., eNodeB, PGW, S-CSCF, etc.) with the relevant information about the modified session/ event and its updated characteristics. Upon receiving such a notification, the SBCSS 201 or the EBCSS 202 triggers the ACTFSS 206 to determine the appropriate CTF(s). The ACTFSS 206 determines the appropriate CTF(s) by invoking the algorithm described at step 507 above. As will be appreciated by those skilled in the art, the OCS 200 is informed of any change in session characteristics which implies a change in resources used, e.g., bandwidth, codec, media types, number of users. Such changes are not discussed here for the sake of brevity.

At step 511, when the credit units provided by the OCS 200 falls below the minimum threshold specified by the OCS 200, the OCSASS 303 in the CTF 300 sends a trigger to the SBCSS 201 or EBCSS 202 in the OCS 200 with relevant information such as duration elapsed, credit unit value, network conditions, etc. When a notification is received from one or more CTFs that the remaining credit units have fallen below a threshold, the SBCSS 201 or EBCSS 202 triggers the IDSS 203 to determine the appropriate action(s). The IDSS 203 then determines the appropriate action(s) and instructs the CTF(s) 300 accordingly. In some embodiments, the IDSS 203 determines the appropriate actions to be taken when the overall remaining credits is less than x % of entitlement (value of 'x' is provisioned by the operator) by invoking an algorithm in accordance with aspects of the present disclosure. The exemplary algorithm is as follows:

---

If (CTF_Load >= load threshold
OR
CTF_Cong_Level >= Congestion threshold over all accesses
AND
(It is NOT possible to continue the session at nearly same QoS over another access/path which is less expensive)
Then
  Give a warning to the user
  Check user preference for the session
  if user preference = extend session
  Then
    Trigger session to be continued at lower QoS (e.g., lower Qos class identifier (QCI), lower bandwidth), and provide inputs on rating to be applied for different interfaces (e.g., LTE, 3G, Wi-Fi, pico cell) and lower QoS (lower bandwidth, higher delay, etc.)
  Eisif user preference = High QoS is essential
  Then
    If another session of same user with lower priority exists
    Then
      Check if credits from that session can be 'borrowed', by lowering the QoS, or using unused credits, or terminating that session
      If credits can be borrowed (after faking appropriate actions for the session from which credits are borrowed)
      Then
        Inform the CTF accordingly to continue the session at same QoS
      Else
        Do nothing
    Else
      Do nothing
    Fi
  Fi
Else
  Trigger to continue the session on the less expensive access/path at same QoS
Fi

---

In other words, the IDSS 203 determines if the CTF's 300 load or resource occupancy level is greater than or equal to load threshold or if the CTF's 300 congestion level is greater than or equal to congestion threshold over all accesses. If true and if it is not possible to continue the session at nearly same QoS over another access/path which is less expensive, the IDSS 203 then provides a warning to user and checks the user preference for the session. If user preference is to extend session, then the IDSS 203 triggers session to be continued at lower QoS (e.g., lower QoS class identifier (QCI), lower bandwidth), and provide inputs on rating to be applied for different interfaces (e.g., LTE, 3G, Wi-Fi, pico cell) and lower QoS (lower bandwidth, higher delay, etc.). However, if the user preference is that the high QoS is essential, then the IDSS 203 determines if another session of same user with lower priority exists. If true, the IDSS 203 then checks if credits from that session can be 'borrowed', by lowering the QoS, or using unused credits, or terminating that session. If credits can be borrowed (after taking appropriate actions for the session from which credits are borrowed), the IDSS 203 informs the CTF 300 accordingly to continue the session at same QoS. In other scenarios, IDSS 203 triggers to continue the session on the less expensive access/path at same QoS. It should be noted that the threshold values mentioned above are typically provisioned by the operator.

Further, in some embodiments, the IDSS 203 determines the appropriate actions to be taken when the overall remaining credits is less than the operator provisioned minimum values by invoking an algorithm in accordance with aspects of the present disclosure. The exemplary algorithm is as follows:

---

```
If (T_avg_no_credit > T_avg_no_credit_threshold)
OR
(Sess_rej_avg > sess_rej_avg_threshold AND user is NOT a
priority user)
OR
(Cr_units_not_chgd > Cr_units_not_chgd_threshold AND
user is NOT a 'good' user)
Then
   Terminate the session
   Send a notification to the user
Else
   If (CTF_Load_level < CTF_load_threshold AND
   CTF_cong_level < CTF_cong_threshold)
   Then
   If user preference = QoS essential
   Then
      Compute extent to which session can be continued at
      same QoS = minimum value obtained from (T_avg_
      no_credit_threshold -T_avg__no_credit) and
      (sess_rej_avg_threshold - Sess_rej_avg). This
      minimum value may be represented as duration, or
      amount of data, or bandwidth, etc.
      Pass relevant instructions to the CTF(s).
   Else
      Instruct to offload session to a less expensive interface/path.
      Compute extent to which session can be continued at same
      QoS = minimum value obtained from (T_avg_no_credit_
      threshold -T_avg_no_credit) and (sess_rej_avg_threshold
      -Sess_rej_avg). This minimum value may be represented
      as duration, or amount of data, or bandwidth, etc.
      Pass relevant instructions to the CTF(s).
Fi
```

---

In other words, the IDSS 203 determines if the average duration for which the user sessions continued beyond minimum credit (T_avg_no_credit) is greater than the corresponding threshold (T_avg_no_credit_threshold), or if average number of sessions rejected (Sess_reLavg) is greater than the corresponding threshold (sess_rej_avg_threshold) and user is not a priority user, or if credit units not actually charged (Cr_units_notchgd) is greater than the corresponding threshold (Cr_units_not_chgd_threshold) and user is not a 'good' user. If true, the IDSS 203 terminates the session and sends a notification to the user. However, if not true, the IDSS 203 determines if the CTF load level (CTF_Load_level) is less than the corresponding threshold (CTF_load_threshold) and if the CTF congestion threshold (CTF_cong_level) is less than the corresponding threshold (CTF_cong_threshold). If true, the IDSS 203 determines if the user preference is that the QoS is essential. If true, the IDSS 203 computes extent to which session may be continued at same QoS. However, if not true (i.e., QoS is not essential), the IDSS 203 instructs the CTF 300 and/or appropriate network elements to offload the session to a less expensive interface or path. For example, the IDSS 203 may instruct an ongoing data session over LTE access to be offloaded over Wi-Fi, and may pass appropriate instructions to the PDN GW, and may also to the T-WAG/ePDG. The IDSS 203 further computes extent to which session may be continued at same QoS. In some embodiments, the extent may be minimum value obtained from (T_avg_no_credit_threshold–T_avg_no_credit) and (sess_reavg_threshold–sess_rej_avg). It should be noted that this minimum value may be represented as duration, or amount of data, or bandwidth, or other such quantifiable parameters. Again, it should be noted that the threshold values mentioned above are typically provisioned by the operator. Further, it should be noted that whether a user is 'good' or not may be explicitly provisioned by the operator, or may be determined by the OCS 200 in an automated manner. In some embodiments, the OCS 200 may be taken into consideration the timeliness of payment, frequency of overdue credit usage by the user, abuse of network resources by the user, etc. It may then be provided as an input to the IDSS 203 in the OCS 200 via the PSS 208.

Upon receiving instructions from the IDSS 203, the OCASS 303 in the CTF 300 triggers execution of those actions. For example, if a trigger is received to continue the session at lower QoS, the OCASS 303 checks the interfaces that are available and their resource status and determines if session can be offloaded on a lower QoS and less expensive interface based on resource availability and policy. If session cannot be offloaded, then the OCASS 303 determines if session can continue on same interface at lower QoS, based on resource availability. If not possible, then the OCASS 303 checks if session can be split across another less expensive interface.

At step 503, upon receiving an indication from the OCASS 303 in the CTF(s) 300 that the session is terminated with CTF session termination parameters, the SBCSS 201 triggers the IDSS 203 with the received information. The IDSS 203 then updates the historical data of various parameters that are stored for future use as follows:

(a) compute and store the new average duration for which the user sessions continued beyond minimum credit (T_avg_no_credit) as follows:

> New value of $T\_avg\_no\_credit$=AVERAGE ((stored value of $T\_avg\_no\_credit$*number of sessions)+ duration for which the current session continued without adequate credits as received from SBCSS)

(b) compute the updated average number of sessions rejected (Sess_rej_avg) during the time in which the current session continued without adequate credits as follows:

> New value of Sess_rej_avg=AVERAGE ((stored value of sess_rej_avg*number of sessions)+ (sess_rej_value for current session*SCF))

Where, SCF=0.8, if CTF load>CTF_load_threshold, AND congestion level in network segment of CTF>CTF_congestion threshold=0.9, if CTF load<=CTF_load_threshold, OR congestion level in network segment of CTF<=congestion threshold=1, otherwise
CTF_load_threshold and CTF_congestion_threshold are pre-provisioned by the operator.

(c) Compute the credit units not actually charged (Cr_units_not_chgd) to the user as follows:

Obtain the rating/tariff information for the session from the RSS.

Using the relevant information from CTF session termination parameters (e.g., duration for which the session continued without credits if rating is based on duration, amount of data transferred when the user did not have enough credits if the rating is based on bytes of data transferred, etc.), compute the credit units that has not been charged to the user.

Increment existing value of credit units not charged (Cr_units_not_chgd) to the user with the value computed in above step.

After performing the above actions, the IDSS 203 clears local resources for the session, and sends an acknowledgement to the SBCSS 201. The SBCSS 201 then triggers all local resources in the OCS 200 to be cleared for the session, and sends an acknowledgement to the CTF 300. The CTF 300 also then clears all resources for the session.

Thus, the techniques described in the embodiments discussed above provide for effective online charging based on accurate determination of resource consumption per user session (RCPUS) and further based on determination of appropriate network element for performing charging function (CTF) in order to minimize switching and disruption in charging function. For example, as discussed above in step 502, the resource usage determination based on resource consumption on different channels and network-segments may be performed by the SBCSS 201 or the EBCSS 202 in the OCS 200 and by taking into consideration network-path and network-traffic conditions for roaming user. Further, as discussed above in step 507, determination of appropriate CTF may be performed by the ACTFSS 206 in the OCS 200 while the charging continuity may be ensured by the SBCSS 201 or the EBCSS 202 in the OCS 200, and the CTFs 300.

Further, the techniques described in the embodiments discussed above provide for optimized service continuity based on determination of remaining entitlement (RE) for a user at semi-real-time as well as based on dynamically taking an appropriate action to offload session, split session, terminate session, etc. For example, as discussed above in step 502, determination of RE for the user at semi-real-time may be performed by the SBCSS 201 or the EBCSS 202 in the OCS 200 using the aggregated accurate-resource-consumption-information for all sessions of the user. Further, as discussed above in step 511, dynamically taking an appropriate action to offload session, split session, terminate session, etc. may be performed by the IDSS 203 in the OCS 203 based on the RE, network-conditions, user-preferences, etc.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
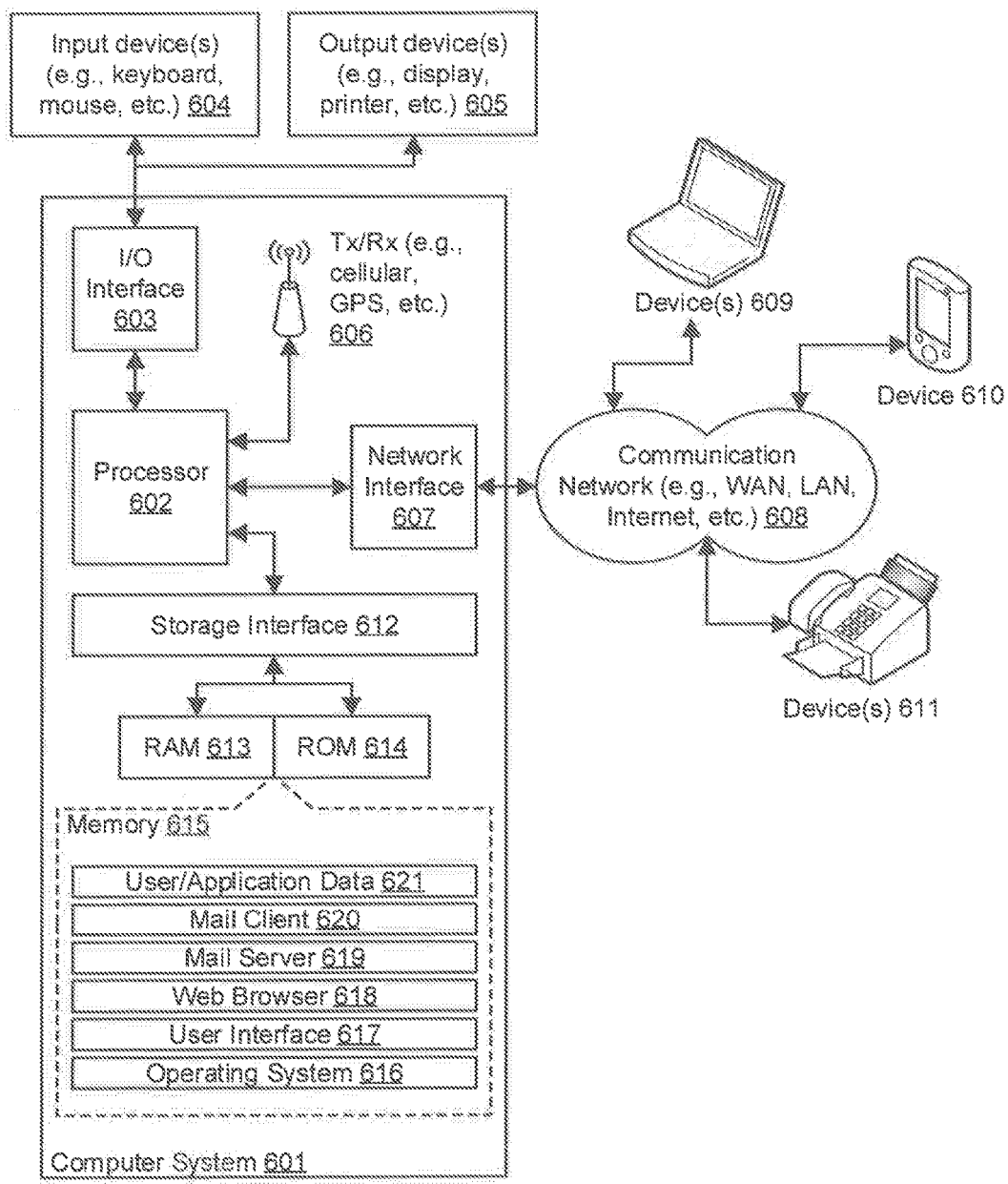
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing components of communication network 100, the OCS 200, and the CTF 300 for dynamic selection of media server in the communication network. Computer system 601 may comprise a central processing unit ("CPU" or "processor") 602. Processor 602 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 413, ROM 414, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. (e.g., user characteristics, session characteristics, network conditions, provisioned inputs and thresholds, configuration data, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for a mechanism for effective online charging for scenarios involving multiple accesses, optimal routing, and all associated aspects. The techniques further provides for optimized service for a user in communication networks (wireless, wired, homogenous, and heterogeneous network). As will be appreciated by those skilled in the art, the techniques provides for effective online charging and optimized service continuity by taking into consideration user-entitlement, user-preferences, network conditions and real-time resource consumption information per user (all sessions for the user).

The specification has described system and method for online charging in a communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for online charging in a communication network, the method comprising:
    monitoring, via a network device, at least one of a user characteristic, a session characteristic, an event characteristic, and a network condition during one or more ongoing communication sessions involving an online charging via one or more initial charging trigger functions;
    determining, via the network device, a need for selection of one or more new charging trigger functions based on at least one of the user characteristic, the session characteristic, the event characteristic, and the network condition; and
    dynamically selecting, via the network device, the one or more new charging trigger functions in response to the need so as to perform online charging for the one or more ongoing communication sessions based on substantially accurate determination of resource consumption in real-time.

2. The method of claim 1, wherein the one or more charging trigger functions comprise one or more network elements capable of performing the role of charging trigger functions for the one or more ongoing communication sessions.

3. The method of claim 1, wherein the one or more charging trigger functions continuously monitors and accounts for the real time resource consumption for the communication session at a specified granularity and at a specified frequency.

4. The method of claim 1, wherein determining or dynamically selecting further comprises considering a plurality of pre-provisioned policies, criteria, and threshold values related to at least one of the ongoing communication sessions, the online charging, user entitlements, user preferences, the network condition, and the selection of the new charging trigger function.

5. The method of claim 4, wherein determining or dynamically selecting further comprises comparing the at least one of the user characteristic, the session characteristic, and the network condition against corresponding pre-pre-provisioned policies, criteria, and thresholds.

6. The method of claim 1, further comprising providing charging related information to the dynamically selected one or more new charging trigger functions.

7. The method of claim 1, further comprising determining remaining user entitlement at a periodic interval based on an aggregate resource consumption for all of the one or more communication sessions by the user.

8. The method of claim 7, further comprising dynamically determining one or more appropriate actions based on at least one of the remaining user entitlements, user preferences, and the network condition, wherein the one or more appropriate actions comprise at least one of offloading communication session, splitting communication session, continuing session at a lower quality of service, and terminating communication session.

9. The method of claim 1, further comprising performing charging trigger function handover from the existing charging trigger function to the new charging trigger function.

10. The method of claim 1, wherein the user characteristic comprises at least one of an identification of a user participating in the ongoing communication session, a policy with respect to the user, a location of the user, a mobility of the user, and a past behavior of the user.

11. The method of claim 1, wherein the session characteristic comprises at least one of a type of the session, a codec employed in the session, a policy with respect to the session, a duration elapsed since a previous selection of a charging trigger function for the session, a service invoked during the session, and a bandwidth consumed during the session.

12. The method of claim 1, wherein the event characteristic comprises at least one of a type of the event, a handover of the user, a policy update by the network operator, an offloading of the session, a registration of the user with an additional device.

13. The method of claim 1, wherein the network condition comprises at least one of a load on each of the one or more charging trigger functions, a policy with respect to selection of the charging trigger function, and a congestion in the network segment in which each of the plurality of charging trigger functions is located.

14. The method of claim 1, further comprising selecting the one or more initial charging trigger functions at the start of the one or more ongoing communication sessions based on at least one of the user characteristic, the session characteristic, the event characteristic, and the network condition.

15. A system for online charging in a communication network, the system comprising:
    at least one processor; and
    a computer-readable medium storing instructions that, when executed by the at least one processor, cause the at least one processor to perform operations comprising:
        monitoring at least one of a user characteristic, a session characteristic, an event characteristic, and a network condition during one or more ongoing communication sessions involving an online charging via one or more initial charging trigger functions;
        determining a need for selection of one or more new charging trigger functions based on at least one of the user characteristic, the session characteristic, the event characteristic, and the network condition; and
        dynamically selecting, via the network device, the one or more new charging trigger functions in response to the need so as to perform online charging for the one or more ongoing communication sessions based on substantially accurate determination of resource consumption in real-time.

16. The system of claim 15, wherein the one or more charging trigger functions continuously monitors and accounts for the real time resource consumption for the communication session at a specified granularity and at a specified frequency.

17. The system of claim 15, wherein determining or dynamically selecting further comprises:
   considering a plurality of pre-provisioned policies, criteria, and threshold values related to at least one of the ongoing communication sessions, the online charging, user entitlements, user preferences, the network condition, and the selection of the new charging trigger function; and
   comparing the at least one of the user characteristic, the session characteristic, and the network condition against corresponding pre-pre-provisioned policies, criteria, and thresholds.

18. The system of claim 15, wherein the operations further comprise providing charging related information to the dynamically selected one or more new charging trigger functions.

19. The system of claim 15, wherein the operations further comprise determining remaining user entitlement at a periodic interval based on an aggregate resource consumption for all of the one or more communication sessions by the user.

20. The system of claim 19, wherein the operations further comprise dynamically determining one or more appropriate actions based on at least one of the remaining user entitlements, user preferences, and the network condition, wherein the one or more appropriate actions comprise at least one of offloading communication session, splitting communication session, continuing session at a lower quality of service, and terminating communication session.

21. The system of claim 15, wherein the operations further comprise performing charging trigger function handover from the existing charging trigger function to the new charging trigger function.

22. The system of claim 15, wherein the operations further comprise selecting the one or more initial charging trigger functions at the start of the one or more ongoing communication sessions based on at least one of the user characteristic, the session characteristic, the event characteristic, and the network condition.

23. A non-transitory computer-readable medium storing computer-executable instructions for:
   monitoring at least one of a user characteristic, a session characteristic, an event characteristic, and a network condition during one or more ongoing communication sessions involving an online charging via one or more initial charging trigger functions;
   determining a need for selection of one or more new charging trigger functions based on at least one of the user characteristic, the session characteristic, the event characteristic, and the network condition; and
   dynamically selecting the one or more new charging trigger functions in response to the need so as to perform online charging for the one or more ongoing communication sessions based on substantially accurate determination of resource consumption in real-time.

* * * * *